3,247,263
THERMAL HYDROCRACKING OF DIPHENYL
ETHER TO PHENOL AND BENZENE
George J. Weidenhammer, Wenonah, N.J., assignor to
Socony Mobil Oil Company, Inc., a corporation of New
York
No Drawing. Filed Nov. 6, 1961, Ser. No. 150,170
3 Claims. (Cl. 260—621)

This invention relates to phenol manufacture. It is more particularly concerned with a method for converting by-product diphenyl ether into more valuable products.

As is well known to those familiar with the art, diphenyl ether is obtained as a by-product in the manufacture of phenols. For example, this ether is produced in appreciable quantity as a by-product in the synthesis of phenol by reacting chlorobenzene with aqueous sodium carbonate or aqueous sodium hydroxide. Diphenyl ether has a relatively low market value. It is highly desirable to be able to convert this ether into more valuable marketable product.

It has now been found that diphenyl ether can be converted into more valuable products by a process that is simple and economically feasible. It has been discovered that diphenyl ether can be hydrocracked in good yield to produce phenol and benzene.

Accordingly, it is an object of this invention to provide a feasible process for converting diphenyl ether into more valuable products. A specific object is to provide a process for converting diphenyl ether into phenol and benzene. A more specific object is to provide a thermal, non-catalytic hydrocracking process for converting diphenyl ether into phenol and benzene. Other objects and advantages of the process of this invention will be apparent to those skilled in the art, from the following detailed description.

In general the present invention provides a non-catalytic process for converting diphenyl ether into phenol and benzene, that comprises admixing diphenyl ether and hydrogen, in a molar ratio of hydrogen to diphenyl ether varying between about 2 and about 30, and contacting the mixture thus obtained in a reaction zone at a temperature of at least 1000° F., at a pressure greater than 100 p.s.i.g., and for a period of time varying between about 5 seconds and about 50 seconds.

The process of this invention is one of thermal hydrocracking. The major products are phenol and benzene. There are produced minor amounts of biphenyl naphthalene, diphenylene oxide, and paraffins. Biphenyl and diphenylene oxide can be recycled.

The process is carried out at temperatures of at least about 1000° F. Preferably, the process is operated at temperatures between about 1200° F. and about 1400° F. In general the pressure can be between about 100 p.s.i.g. and about 2000 p.s.i.g. In preferred practice the pressure will be between about 300 p.s.i.g. and about 800 p.s.i.g. The contact time, i.e., the time of residence in the reaction zone, can be between about 5 seconds and about 50 seconds. Preferably, it will be between about 10 seconds and about 30 seconds.

The molar ratio of hydrogen to diphenyl ether can vary between about 2 and about 30, preferably between about 5 and about 20. A molar ratio of about 15 has been found to be a feasible working ratio. It will be recognized by those skilled in the art that the variables in this process are interdependent in the usual manner.

The present process can be carried out batchwise or continuously. It is most adaptable to continuous operation, in which unconverted diphenyl ether can be recycled. The net reaction is exothermic. However, heat to initiate reaction must be supplied by heating the charge to the reaction zone or by supplying external heat to the reaction zone, or a combination of the two.

EXAMPLES 1, 2, AND 3

Three runs were made in which diphenyl ether and hydrogen were passed through an isothermal reactor. In each run the molar ratio of hydrogen to diphenyl ether was about 15, the pressure was 600 p.s.i.g., and the contact time was 25 seconds. Each run was made at a different reaction temperature. Effluent streams were analyzed by mass spectrometry. Pertinent data are set forth in the table.

Table

| Example | 1 | 2 | 3 |
|---|---|---|---|
| Processing Conditions: | | | |
| Temperature, °F | 1,202 | 1,253 | 1,306 |
| Pressure, p.s.i.g | 600 | 600 | 600 |
| $H_2$/ether, molar | 15 | 15 | 15 |
| Contact Time, sec | 25 | 25 | 25 |
| Charge: | | | |
| Phenyl ether, g | 100 | 100 | 100 |
| Hydrogen, g | 17.3 | 17.5 | 19.2 |
| Total | 117.3 | 117.5 | 119.2 |
| Product Yields: | | | |
| Benzene, g | 15.6 | 34.8 | 63.6 |
| Phenol, g | 15.6 | 23.7 | 12.2 |
| Diphenyl ether, g | 64.7 | 33.8 | 6.6 |
| Biphenyl, g | 0.2 | 1.0 | 2.0 |
| Diphenylene oxide, g | 2.2 | 3.4 | 2.1 |
| Naphthalene, g | 0.1 | 0.2 | 0.4 |
| $C_1$-$C_3$ HC, g | 1.6 | 2.9 | 7.9 |
| $C_4$-$C_6$ HC, g | | 1.0 | 9.1 |
| Hydrogen, g | 17.2 | 16.7 | 15.1 |
| Total | 117.2 | 117.5 | 119.0 |
| Conversion of Ether, wt. percent | 35.3 | 66.2 | 93.4 |
| Benzene/phenol, wt | 1.0 | 1.5 | 5.2 |
| Benzene/phenol, molar | 1.2 | 1.8 | 6.3 |
| Ring retention, percent | 98.3 | 97.4 | 91.4 |

From the data in the table, it will be noted that at each conversion level the major products were benzene and phenol. The amount of benzene relative to the amount of phenol produced increased with increasing conversion, as did the amount of light hydrocarbons. Minor amounts of biphenyl and diphenylene oxide were formed, which can be recycled together with unreacted diphenyl ether. During a 32-hour run time, only a very small amount of coke was formed and this was in the preheater apparently at the vaporization point.

Although the present invention has been described with preferred embodiments, it will be understood that modifications and variations may be resorted to, without departing from the spirit and scope of this invention, as those skilled in the art will readily understand. Such variations and modifications are considered to be within the purview and scope of the appended claims.

What is claimed is:

1. A non-catalytic process for converting diphenyl ether into benzene and phenol, that comprises establishing a mixture of diphenyl ether and hydrogen, in a molar ratio of hydrogen to diphenyl ether of between about 2 and about 30, and subjecting said mixture in a reaction zone to a temperature of at least 1000° F. and up to 1400° F., at a pressure of between about 100 p.s.i.g. and about 2000 p.s.i.g., and for a period of time of between about 5 seconds and about 50 seconds.

2. A non-catalytic process for converting diphenyl ether into benzene and phenol, that comprises establishing a mixture of diphenyl ether and hydrogen, in a molar ratio of hydrogen to diphenyl ether of between 5 and 20, and subjecting said mixture in a reaction zone to a temperature of between 1200° F. and 1400° F., at a pressure of between 300 p.s.i.g. and 800 p.s.i.g., and for a period of time of between 10 seconds and 30 seconds.

3. A non-catalytic process for converting diphenyl ether into benzene and phenol, that comprises establishing a mixture of diphenyl ether and hydrogen, in a molar ratio of hydrogen to diphenyl ether of about 15, and subjecting said mixture in a reaction zone to a temperature of between about 1200° F. and about 1300° F., at a pressure of about 600 p.s.i.g., and for a period of time of about 25 seconds.

References Cited by the Examiner

UNITED STATES PATENTS 2,862,035  11/1958  Mueller et al. _____ 260—621 X

OTHER REFERENCES

Ipatieff: "Catalytic Reactions at High Temperatures and Pressures," pages 393–394, pub. by Macmillan Co., New York (1930).

Ipatieff: "Catalytic Reactions at High Temperatures and Pressures," page 395 (1 page), published by Macmillan Co., New York (1936).

LEON ZITVER, *Primary Examiner.*

CHARLES B. PARKER, *Examiner.*